United States Patent
Papamichael et al.

(10) Patent No.: US 12,348,419 B2
(45) Date of Patent: Jul. 1, 2025

(54) FEEDBACK-BASED DYNAMIC NETWORK FLOW REMAPPING

(71) Applicant: Microsoft Technology Licensing, LLC, Redmond, WA (US)

(72) Inventors: Michael Konstantinos Papamichael, Redmond, WA (US); Mohammad Saifee Dohadwala, Redmond, WA (US); Adrian Michael Caulfield, Woodinville, WA (US); Prashant Ranjan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 17/747,221

(22) Filed: May 18, 2022

(65) Prior Publication Data

US 2023/0379254 A1 Nov. 23, 2023

(51) Int. Cl.
*H04L 47/12* (2022.01)
*H04L 47/26* (2022.01)

(52) U.S. Cl.
CPC ............ *H04L 47/12* (2013.01); *H04L 47/26* (2013.01)

(58) Field of Classification Search
CPC ......... H04L 47/12; H04L 47/26; H04L 45/24; H04L 45/38; H04L 45/74; H04L 45/7453; H04L 47/11; H04L 47/125
See application file for complete search history.

(56) References Cited

U.S. PATENT DOCUMENTS

| | | | | |
|---|---|---|---|---|
| 6,198,722 | B1 * | 3/2001 | Bunch | H04L 47/266 370/229 |
| 9,473,408 | B1 * | 10/2016 | Kabbani | H04L 47/122 |
| 2015/0146526 | A1 * | 5/2015 | Kulkarni | H04L 47/122 370/230.1 |
| 2022/0103484 | A1 * | 3/2022 | Penaranda Cebrian | H04L 47/25 |
| 2023/0096063 | A1 * | 3/2023 | Xu | H04L 65/80 |

FOREIGN PATENT DOCUMENTS

WO 2021135416 A1 7/2021

OTHER PUBLICATIONS

Kabbani, et al., "FlowBender: Flow-level Adaptive Routing for Improved Latency and Throughput in Datacenter Networks", In Proceedings of the 10th ACM International on Conference on Emerging Networking Experiments and Technologies, Dec. 2, 2014, pp. 149-159.
"International Search Report and Written Opinion Issued in PCT Application No. PCT/US23/013394", Mailed Date: May 17, 2023, 16 Pages.

* cited by examiner

*Primary Examiner* — Lan-Huong Truong
(74) *Attorney, Agent, or Firm* — Workman Nydegger

(57) ABSTRACT

Techniques and algorithms for monitoring network congestion and for triggering a flow to follow a new path through a network. The network is monitored, and network feedback data is acquired, where that data indicates whether the network is congested. If the network is congested, a feedback-driven algorithm can trigger a flow to follow a new path. By triggering the flow to follow the new path, congestion in the network is reduced. To identify congestion, the feedback data is analyzed to determine whether flows are colliding. The feedback-driven algorithm determines that a network remapping event is to occur in an attempt to alleviate the congestion. A flow is then selected to be remapped to alleviate the congestion.

20 Claims, 11 Drawing Sheets

FEEDBACK-BASED DYNAMIC NETWORK FLOW REMAPPING

BACKGROUND

A computer "network" is a set of interconnected or interlinked computing devices that can communicate with one another by exchanging data and by sharing resources. The network includes any number of endpoints. These endpoints are connected to one another via any number of switches. One endpoint (e.g., a "source endpoint") can send information in the form of a "packet" to another endpoint (e.g., a "destination endpoint").

It may be the case that multiple packets share common characteristics. As a result of these packets sharing those common characteristics, those packets may end up following the same path through the network. The term "path" refers to a set of one or more specific switches and links (e.g., multiple links can connect a pair of switches) that are used to route a packet through the network. When a set of packets having similar characteristics end up following the same path, that set of packets can be referred to as a "flow." Packets that belong to the same TCP/IP session are included in a flow, and it is typically (though not always) the case that these packets follow the same path through the network.

Sometimes, flows collide with one another in the network. For instance, a first flow might follow a first path that includes switch "C." A second flow might follow a second path that also includes switch "C." If the bandwidth capabilities of switch "C" are not sufficiently high, then switch "C" might become congested. Additionally, or alternatively, congestion can occur as a result of suboptimal path selection through a network. Link oversubscription can also contribute to congestion issues. Regardless of the cause, congestion can have a deleterious impact on the network, such as packet delays or even packet drops. Because flows often collide with one another (e.g., by oversubscribing a commonly used switch or link), it is desirable to implement a system that can help reduce congestion and collisions in the network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, networks, devices, and methods for triggering a flow to follow a new path through a network. The network is configured to provide multiple paths from one endpoint to another endpoint. The flow is comprised of a plurality of network packets having similar characteristics. As a result, switches in the network route the network packets through a same path. By triggering the flow to follow the new path, congestion in the network is attempted to be reduced. As used herein, reference to a "switch" can also include references to that switch's output ports and/or links. Thus, the term "switch" should be interpreted broadly to include the switch itself and, additionally or alternatively, to include the switch's output ports and potentially even the links to or from the switch.

Some embodiments identify a plurality of flows traversing the network. The embodiments analyze network feedback data to determine that the flows are colliding with one another and are causing one or more links of the network to be congested. The embodiments select a particular flow to be remapped. Consequently, the particular flow will transition from following a first path through the network to following a second path through the network. In some embodiments, the process of selecting the particular flow is based on a remapping probability function that determines which flow to remap based on relative congestion levels for the flows.

The remapping process for the particular flow includes, for each new network packet in the particular flow, performing a number of operations. One operation includes selecting a field within a header of each new network packet. Another operation includes modifying a value in the selected field. After modifying the value, another operation includes performing a hash on field values in the header, including the modified value mentioned above, to generate a hash value for each new network packet. Yet another operation includes indexing the hash value into an available path for each new network packet, where the available path is the second path. The embodiments then cause new network packets of the particular flow to follow the remapped second path to traverse through the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 shows a scenario where multiple flows are getting hashed in a manner so that the resulting path selected for those flows ends up using the same links, thereby resulting in link collisions.

DETAILED DESCRIPTION

Figure 1:
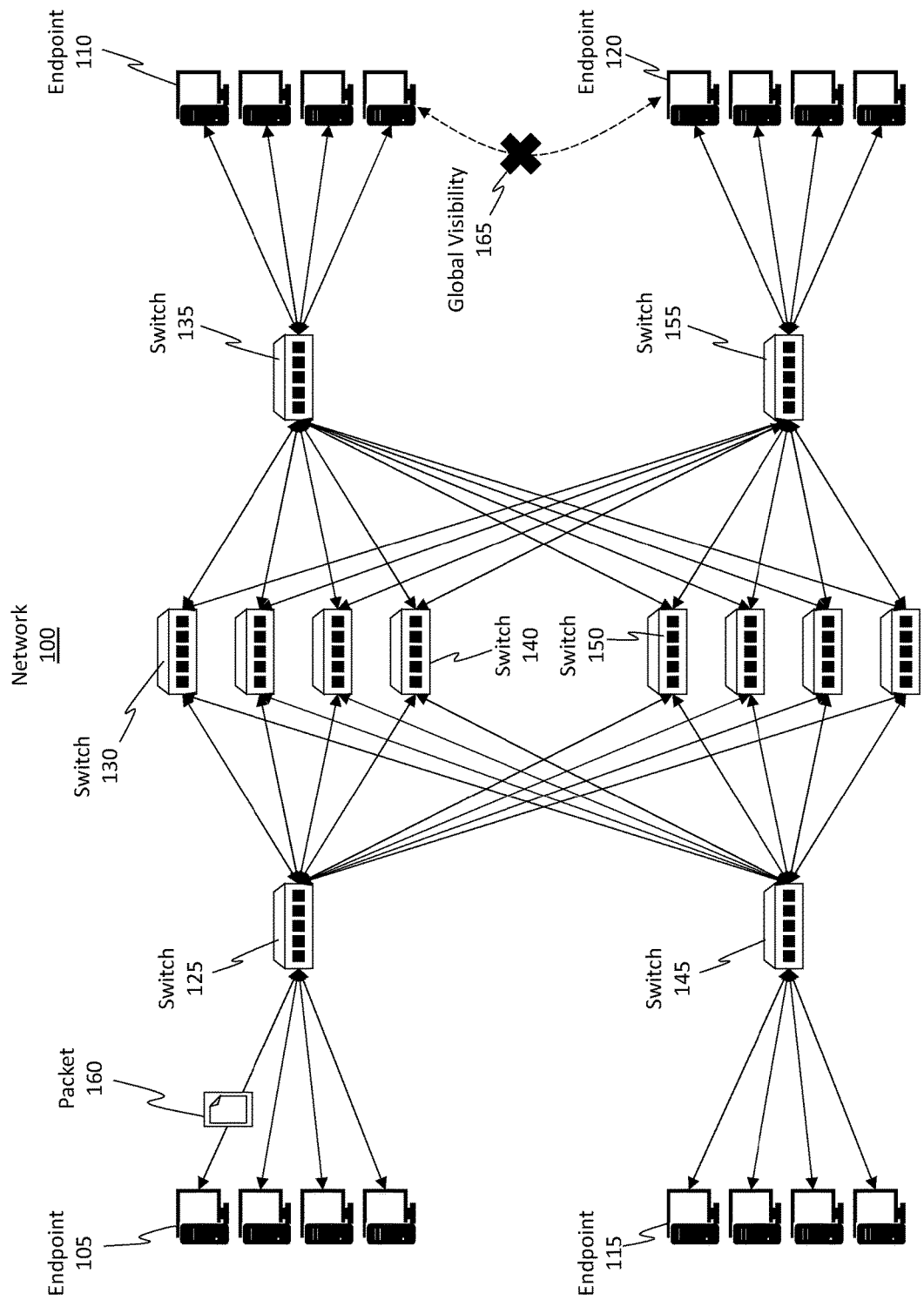
FIG. 1 illustrates an example network comprising multiple endpoints, multiple switches, and multiple paths between each endpoint.

Embodiments disclosed herein relate to systems, networks, devices, and methods for triggering a flow to follow a new path through a network. The flow is comprised of a plurality of network packets having similar characteristics. As a result, switches in the network route the network packets through a same path. By triggering the flow to follow the new path, congestion in the network is attempted to be reduced.

Some embodiments identify flows traversing the network. The embodiments analyze network feedback data to determine that the flows are colliding with one another and are causing one or more links and/or switches to be congested. The embodiments select a particular flow to be remapped. Consequently, the particular flow will transition from following a first path through the network to following a second path. In some embodiments, the selection process is based on a remapping probability function that determines which flow to remap based on relative congestion levels for the flows.

The remapping process for the particular flow includes, for each new network packet in the particular flow, performing a number of operations. One operation includes selecting a field within a header of each new network packet. Another operation includes modifying a value in the selected field. After modifying the value, another operation includes performing a hash operation on field values in the header, including the modified value mentioned above, to generate a hash value for each new network packet. Yet another operation includes indexing the hash value into an available path for each new network packet, where the available path is the second path. The embodiments then cause new network packets of the particular flow to follow the remapped second path to traverse through the network.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field of network management. In particular, the disclosed principles can be followed to beneficially reduce congestion in the network. When multiple flows use the same link and/or switch in the network, that link and/or switch may become oversubscribed or congested. When the link and/or switch is operating at or perhaps even above its bandwidth capabilities, packets can be delayed or potentially dropped. The embodiments are able to detect when the network is congested and are further able to reroute or remap flows to avoid the congestion.

The disclosed techniques can adapt to changing network conditions and can dynamically load balance flows to significantly or even completely eliminate congestion due to link oversubscription. The disclosed techniques are lightweight and do not require any network fabric changes as all the remapping logic can be implemented in the network endpoints.

Beneficially, the disclosed principles can be practiced with very minimal additional overhead imposed on the network. That is, the embodiments are configured to selectively modify a value in a packet's header. By modifying this value, that packet will then travel along a new path through the network, as will be described in more detail later. The other packets in a flow can be similarly modified. By making this modification, a significant improvement to the functionality of the network can occur (e.g., by changing how packets are sent across different available paths), and a significant reduction in congestion can be achieved. Accordingly, these and numerous other benefits will now be described in more detail throughout the remaining portions of this disclosure.

Example Networks

Attention will now be directed to FIG. 1, which illustrates an example network 100 that can be used to implement the disclosed principles. Network 100 can be any type of network, without limitation.

Network 100 is shown as including a number of endpoints, such as endpoints 105, 110, 115, and 120. As used herein, the term "endpoint" refers to a computing device that communicates with one or more intermediary switches and links to communicate with another endpoint. FIG. 1 shows a number of other endpoints that are not labeled. The network 100 can include any number of endpoints.

Network 100 is also shown as including a number of switches, such as switches 125, 130, 135, 140, 145, 150, and 155. As used herein, the term "switch" refers to a computing device that forwards network data packets between different devices, such as between switches and between a switch and an endpoint. Each switch in the network 100 is structured to support a specified amount of bandwidth (e.g., it can be assumed that switches can handle full line-rate throughput on all their ports so they do not have any inherent bottlenecks when there is no output contention), which is the maximum amount of data that the switch can handle or rather, which is the maximum amount of throughput that can be passed through the switch. Stated differently, bandwidth generally refers to the speed by which the switching device can switch itself when routing data between different ports.

Figure 2:
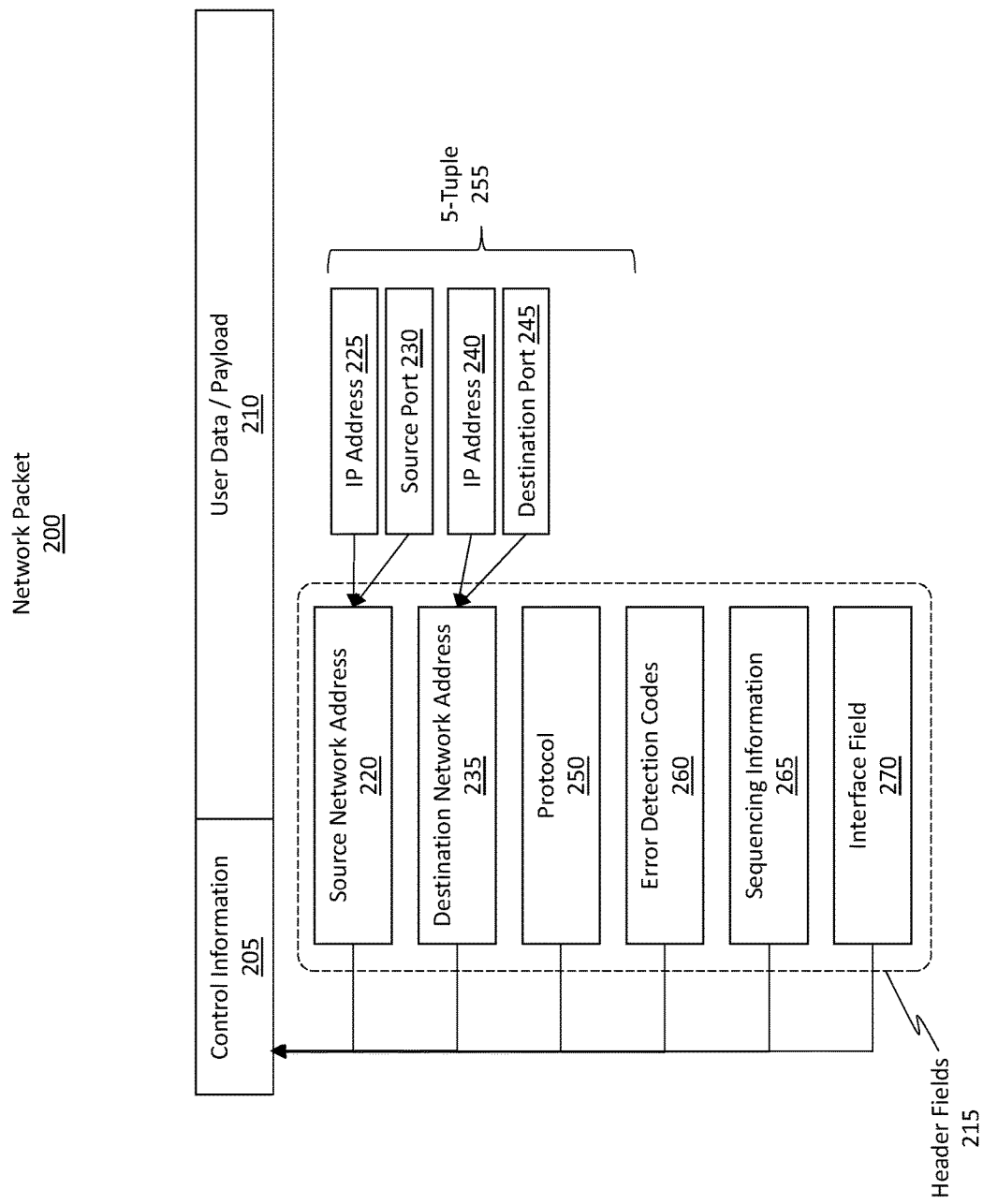
FIG. 2 illustrates details of an example network packet.

FIG. 1 shows an example scenario where an endpoint 105 is using the network 100 to transmit a packet 160 to another endpoint in the network. As used herein, the term "packet" generally refers to a unit of data that is routed between multiple devices. Typically, a single packet is a small segment forming a larger unit of data. FIG. 2 provides some additional details.

FIG. 2 shows a network packet 200, which is representative of the packet 160 from FIG. 1. The network packet 200 typically includes control information 205 and user data or payload 210.

The control information 205 can include various different header fields 215, or rather, fields in the header of the network packet 200. One example of a field is the source network address 220, which refers to the address of the origination endpoint or the source endpoint of the network packet 200. Often, the source network address 220 includes a field for the Internet Protocol (IP) address 225 of the source as well as the source port 230 from where the network packet 200 was transmitted.

Another field in the control information 205 is the destination network address 235. Often, the destination network address 235 includes a field for the IP address 240 of the destination endpoint as well as the destination port 245 that will receive the network packet 200.

The control information 205 typically further includes information regarding the protocol 250 that is being used to transmit the network packet 200. Examples of different network protocols include, but certainly are not limited to, the transmission control protocol/Internet Protocol (TCP/IP) protocol, the border gateway protocol (BGP), the user datagram protocol (UDP), and so on.

The combination of the source IP address 225, the source port 230, the destination IP address 240, the destination port 245, and the protocol 250 are often referred to as a 5-tuple 255. That is, the 5-tuple 255 generally refers to a set of five values that form a TCP/IP connection.

The control information 205 also often includes error detection codes 260, sequencing information 265, and an interface field 270. The error detection codes 260 are a set of additional bits that allow a receiver to determine whether the network packet has been corrupted during transmission. The sequencing information 265 can be used to determine which order the network packets should be organized in order to reconstitute a message. Sometimes, packets are received out of order relative to how they were transmitted, and the sequencing information 265 can be used to re-order the packets. The interface field 270 records both ingress and egress information for a packet (i.e. the direction of travel of the network packet).

Returning to FIG. 1, it is typically the case that global visibility 165 between the endpoints is not available. That is, there may be a plurality of endpoints in the network. Typically, global visibility is not provided for the plurality of endpoints. Global visibility 165 refers to the ability for the endpoints to directly communicate and crosstalk with one another.

Network Flows

Figure 3:
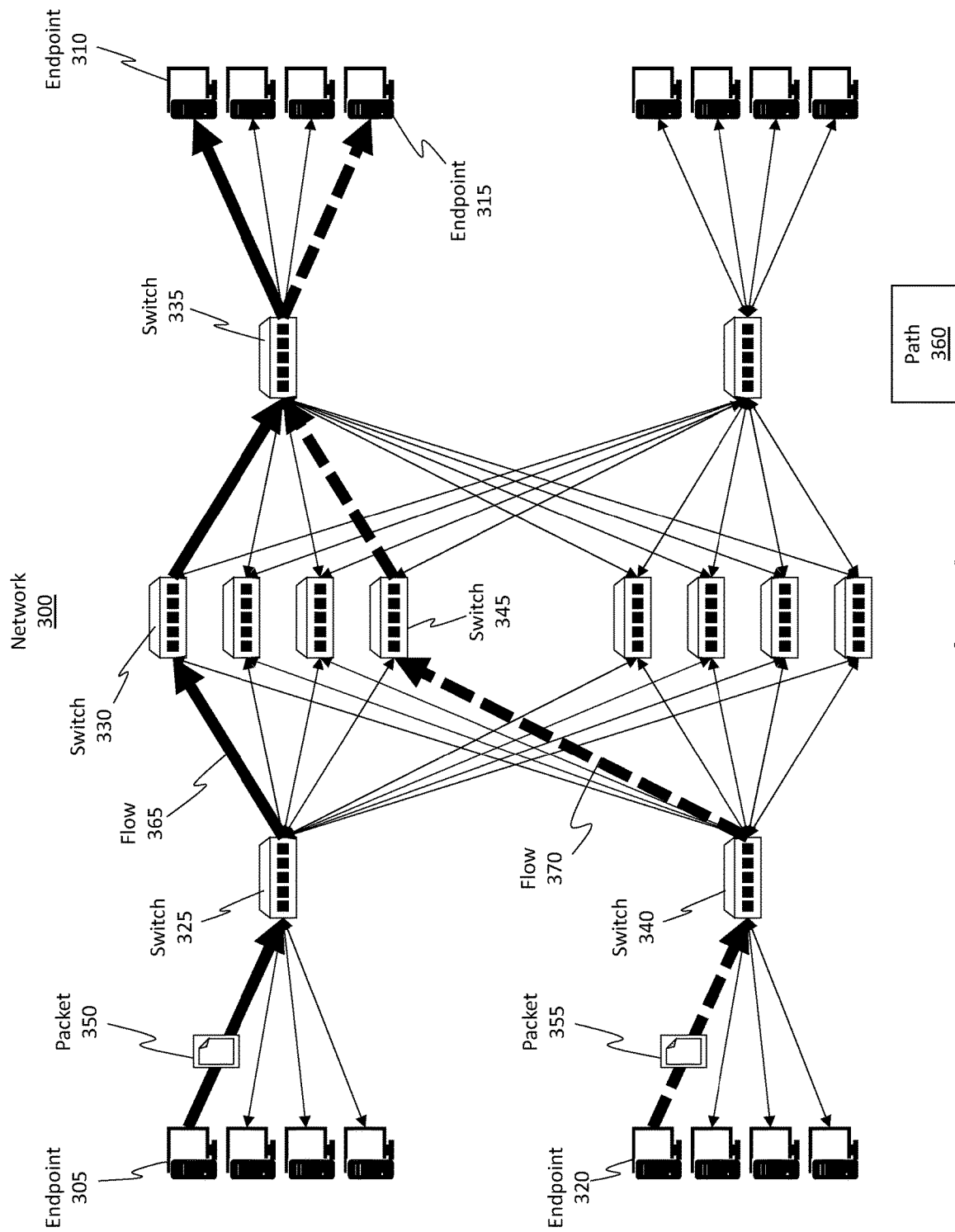
FIG. 3 illustrates details regarding a flow.

Attention will now be directed to FIG. 3, which shows an example network 300 that is similar to the network 100 of FIG. 1. Network 300 includes endpoints 305, 310, 315, and 320. Network 300 further includes switches 325, 330, 335, 340, and 345.

The endpoint 305 is using the network 300 to transmit a packet 350 to the endpoint 310. Similarly, the endpoint 320 is using the network 300 to transmit a packet 355 to the endpoint 315.

It is often the case that a set of packets share some common characteristics. For instance, although the payloads of different network packets may be different, the control information of those network packets may be substantially the same. For example, the source network address, the destination network address, the protocol, the error detection codes, and even the interface fields may all be quite similar or even the same as one another. As a result of these network packets all having common characteristics, it is typically the case that these packets will be transmitted through the network 300 via the same path 360. When a group of packets have similar characteristics and follow the same path through a network, those group of packets are referred to as a "flow." That is, in some cases, the similar characteristics of the network packets, which similar characteristics cause the network packets to be included in the same flow, include similar header characteristics.

FIG. 3 shows a first flow 365. Among many other packets, flow 365 includes the packet 350. The solid, bolded arrows represent the path through the network 300 for the flow 365. For instance, the flow 365 originates at the endpoint 305 and then travels through the switch 325, the switch 330, and the switch 335 before reaching the destination endpoint 310.

FIG. 3 shows a second flow 370. Among many other packets, flow 370 includes the packet 355. The bolded, dotted arrows represent the path through the network 300 for the flow 370. For instance, the flow 370 originates at the endpoint 320 and then travels through the switch 340, the switch 345, and the switch 335 before reaching the destination endpoint 315. Accordingly, a flow is defined as a group of network packets that share common characteristics where, as a result of these common characteristics, the packets in the flow tend to follow the same path through a network.

Figure 4:
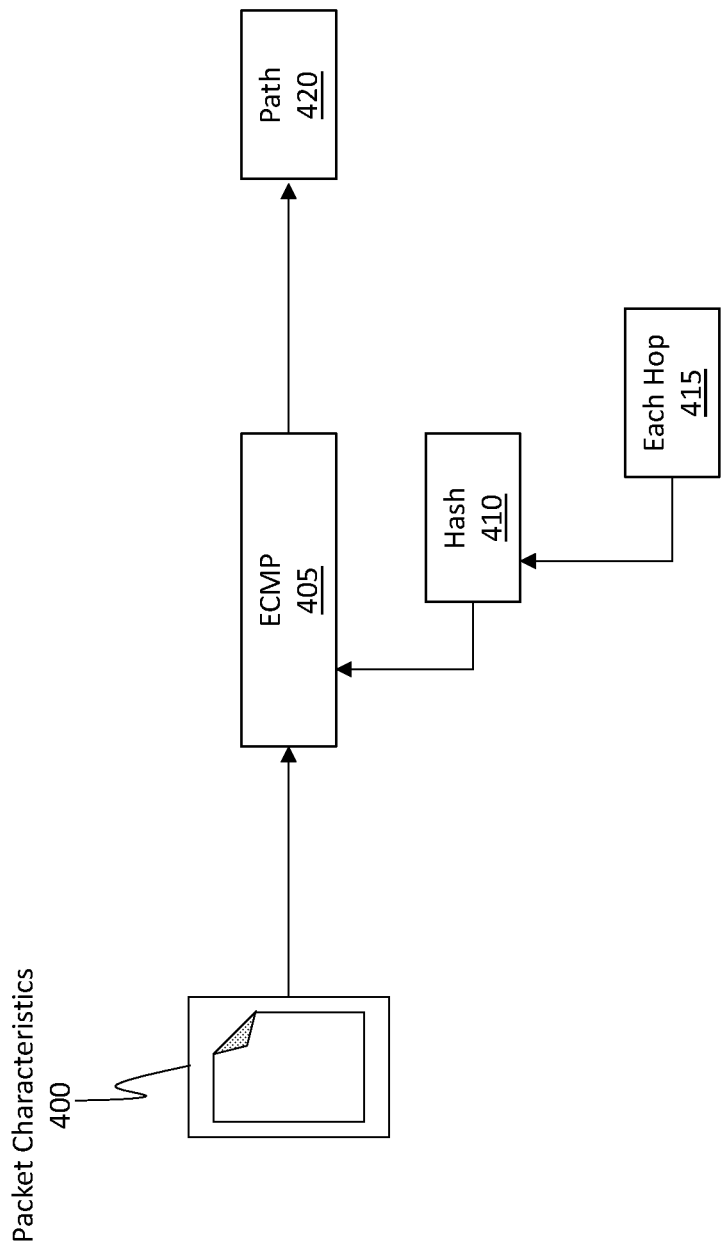
FIG. 4 illustrates how a path is determined for a packet.

Different techniques can be used to route a packet through a network. One common technique is referred to as equal-cost multi-path, or ECMP. ECMP is described in more detail in FIG. 4.

Specifically, each network packet has a set of packet characteristics 400. These characteristics include information about the control information 205 of FIG. 2 and sometimes includes information about the user data/payload 210. The ECMP 405 process involves a network switch extracting the packet characteristics 400 and then performing a hash 410 operation on those characteristics. The resulting hash is then mapped or indexed to a next device or switch (more specifically, the resulting hash is mapped to an output port or next link of a device) that will be used to transmit the packet. This ECMP 405 process is repeated at each hop 415 of the network. By each hop, it is meant that each receiving switch (i.e. the switch that receives the network packet) performs the ECMP 405 hashing process. Eventually, a path 420 through the network is determined, and the packet is delivered to a destination endpoint.

Datacenter networks typically provide multiple paths between any given pair of endpoints. The industry-standard mechanism to load balance flows across these multiple paths is ECMP (equal-cost multi-path), which applies a hashing function to a subset of packet header fields (often the "5-Tuple") to determine the output port on every switch along the path of a packet. An advantage of this routing strategy is that it guarantees in-order delivery as packets belonging to the same flow will always take the same path (since they have the same header bits and will always pick the same output port on every switch hop along the way). However, a disadvantage of ECMP is that the hashing mechanism is oblivious to the load across the multiple candidate paths and underlying links, which can lead to network bottlenecks and congestion due to link oversubscription when the aggregate throughput demand of flows sharing a link exceeds its capacity. An example will be helpful.

With regard to FIG. 3, the endpoint 305 transmits the packet 350 to the switch 325. The switch 325 then performs the ECMP process by extracting various features or characteristics from the packet 350 (e.g., perhaps by extracting the 5-tuple information). These features are fed into a hash function to generate a resulting hash. The hash is then mapped or indexed to a next available switch in the network (more specifically, it is mapped to an output port or link). The routing table for the switch 325 reflects the next link or switch that will be used. The routing table is not necessarily updated; rather, the embodiments are configured to steer traffic over another valid route or path that already existed. Here, the results of the hash are mapped or indexed to the switch 330, so the packet 350 is routed from the switch 325 to the switch 330. The switch 330 is a new "hop" in the network.

The switch 330 then performs the same ECMP process. The results of the hash are mapped to the switch 335. The routing table for the switch 330 is then updated to include this information. Accordingly, the ECMP 405 process generally includes extracting information from a packet's control information (e.g., such as the 5-tuple 255 from FIG. 2) and performing a hash on that set of information. The resulting hash is mapped to a next switch that will be used to transmit the packet. This process can be repeated for each hop through the network. The combination of these hops is the path the packet travels through the network.

Figure 5:
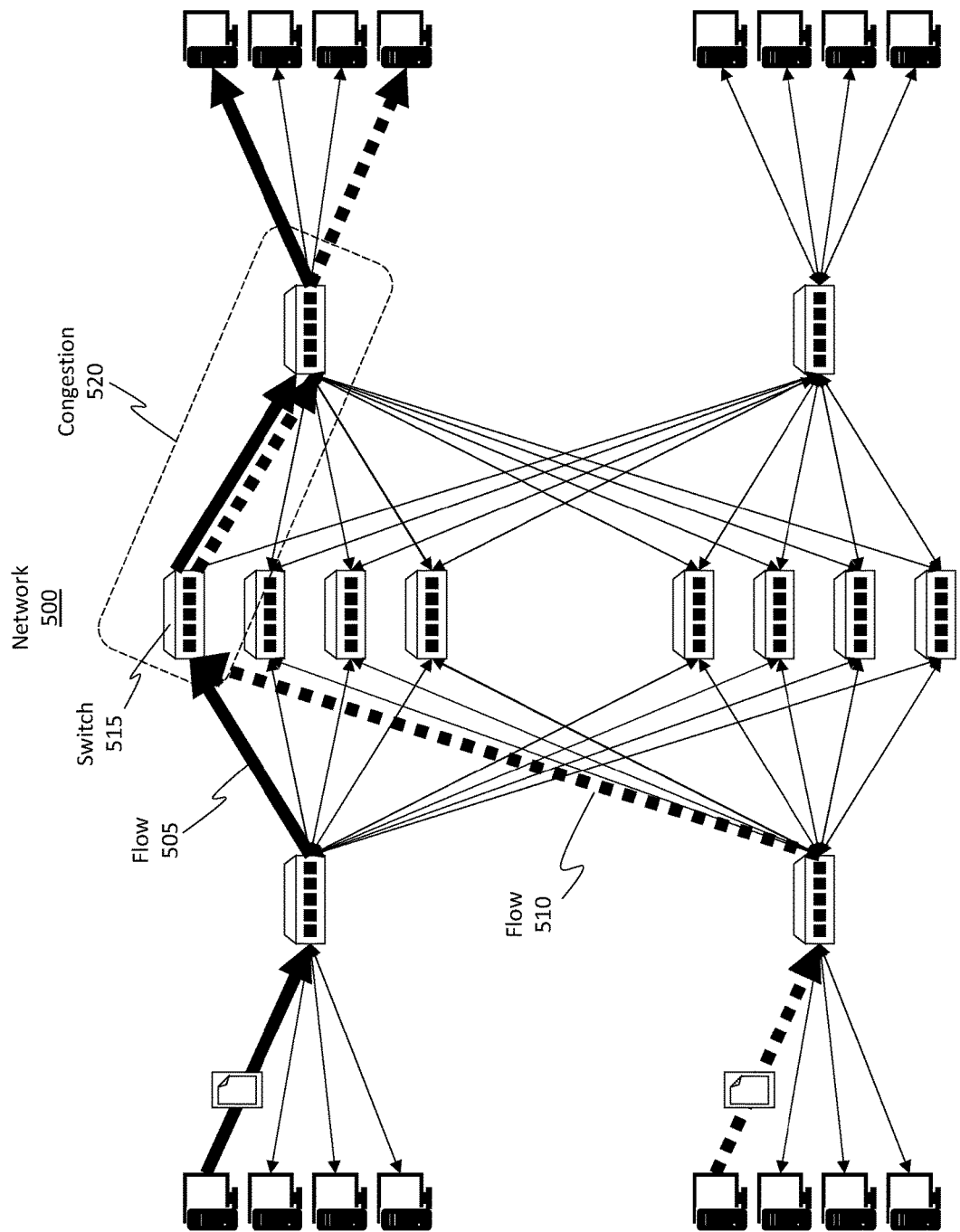
FIG. 5 illustrates an example scenario where multiple flows are colliding with one another on a switch, thereby resulting in congestion in the network. That is.

FIG. 5 shows an example network 500 that is representative of the networks discussed thus far. Here, network 500 is shown as including two different flows, namely, flow 505 and flow 510. As a result of performing the ECMP process on the packets in each flow, both flows are shown as being routed through the same switch 515. Because both flows 505 and 510 are being routed through the same switch 515 (and in particular are being routed through the same output port or link), the network 500 is experiencing congestion 520 at that switch 515 (and in particular at the specific output port or link). It is typically the case that different flows going through a same switch will not cause a congestion issue. When those flows utilize the same output port or link, however, then link collisions and congestion will manifest if the link's bandwidth is being taxed or overused by the multiple flows. For example, if an input and output port of a switch can handle 100 GB, then traffic from two input ports at 100 GB going out to the same output port at 100 GB will cause congestion. Congestion or oversubscription occurs when a switch in the network is operating near (e.g., within a threshold level) or perhaps even above its bandwidth abilities. When congestion occurs, then a switch's buffer will begin to fill up, resulting in delays and potentially even packet losses.

The disclosed embodiments beneficially provide a technique for "remapping" or "rerouting" a flow so that the flow follows a different path through the network. By doing so, the disclosed embodiments can beneficially reduce or perhaps even eliminate network congestion.

Receiving Feedback to Determine Whether the Network is Congested

Figure 6:
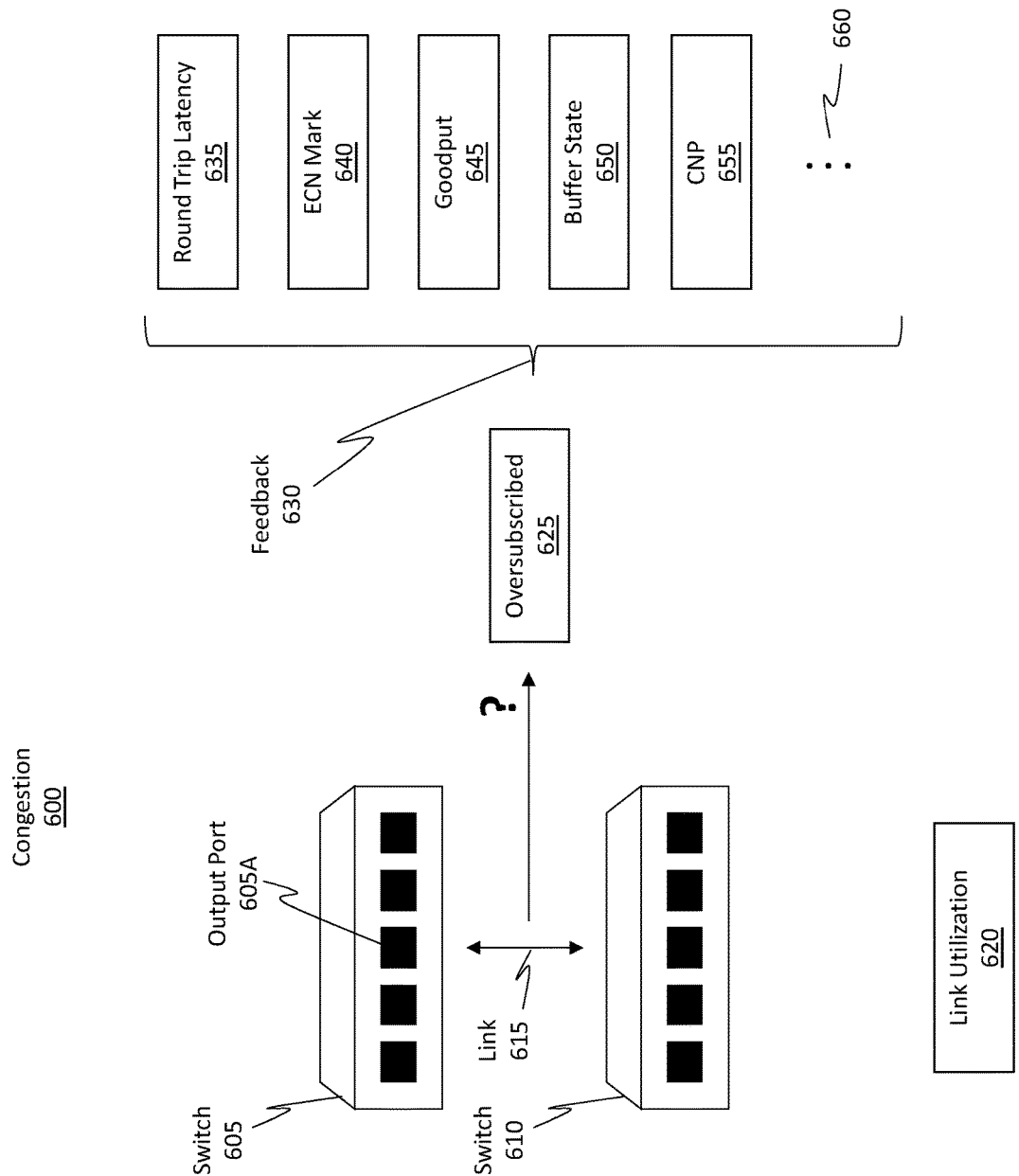
FIG. 6 illustrates an example of feedback data that can be received to determine whether a switch or a link between switches is being overutilized.

FIG. 6 shows a congestion 600 scenario involving a first switch 605 (with an output port 605A) and a second switch 610. These switches are representative of the switches illustrated in the networks of the previous figures. A link 615 is shown between the two switches 605 and 610. The principles disclosed herein are primarily triggered when a link utilization 620 between the switches surpasses a utilization threshold such that the link 615 and the switches 605, 610 are determined to be congested or oversubscribed 625. "Link utilization" generally refers to the amount of bandwidth that is being used by the switch to transmit data packets. As an example, a switch may have a 100 GB bandwidth. If that switch is being used to capacity (e.g., 100 GB), then the switch can be said to be oversubscribed.

By "oversubscribed," it is meant that the overall switching and link bandwidth of a particular switch and/or link is less than the available, or aggregate bandwidth, which is available on all of the ingress switch ports. To determine whether a switch and/or link is oversubscribed, the embodiments receive (e.g., at the endpoints) feedback 630 from the network, and in particular from the various switches and/or links in the network.

As shown in FIG. 6, the feedback 630 can include one or more of a round trip latency 635 metric, an explicit congestion notification (ECN) mark 640, a goodput 645 metric, buffer state 650 information, or congestion notification packet (CNP) 655 metric. The ellipsis 660 shows that other parameters can also be included in the feedback 630.

The round-trip latency 635 (or round-trip delay (RTD) or round-trip time (RTT)) metric refers to the amount of it takes for a packet to be sent to an endpoint plus the amount of time it takes for a receipt acknowledgement to be returned. The ECN mark 640 is an end-to-end notification that indicates congestion by flagging or marking a packet when that packet is delayed in order to indicate congestion. The goodput 645 metric provides a measurement indicative of the speed by which data traverses through a network. The buffer state 650 information indicates how full a buffer is and can also indicate how long packets reside in the buffer. The CNP 655 metric can also be used to indicate congestion in a network.

The various switches in the network can provide this feedback 630 to one or more of the endpoints in the network. The endpoints can then use the feedback 630 to trigger a remapping process that causes a flow to follow a different path through the network. Accordingly, the disclosure will now turn to a discussion on this remapping process.

Remapping Flows to Reduce Congestion

Figure 7:
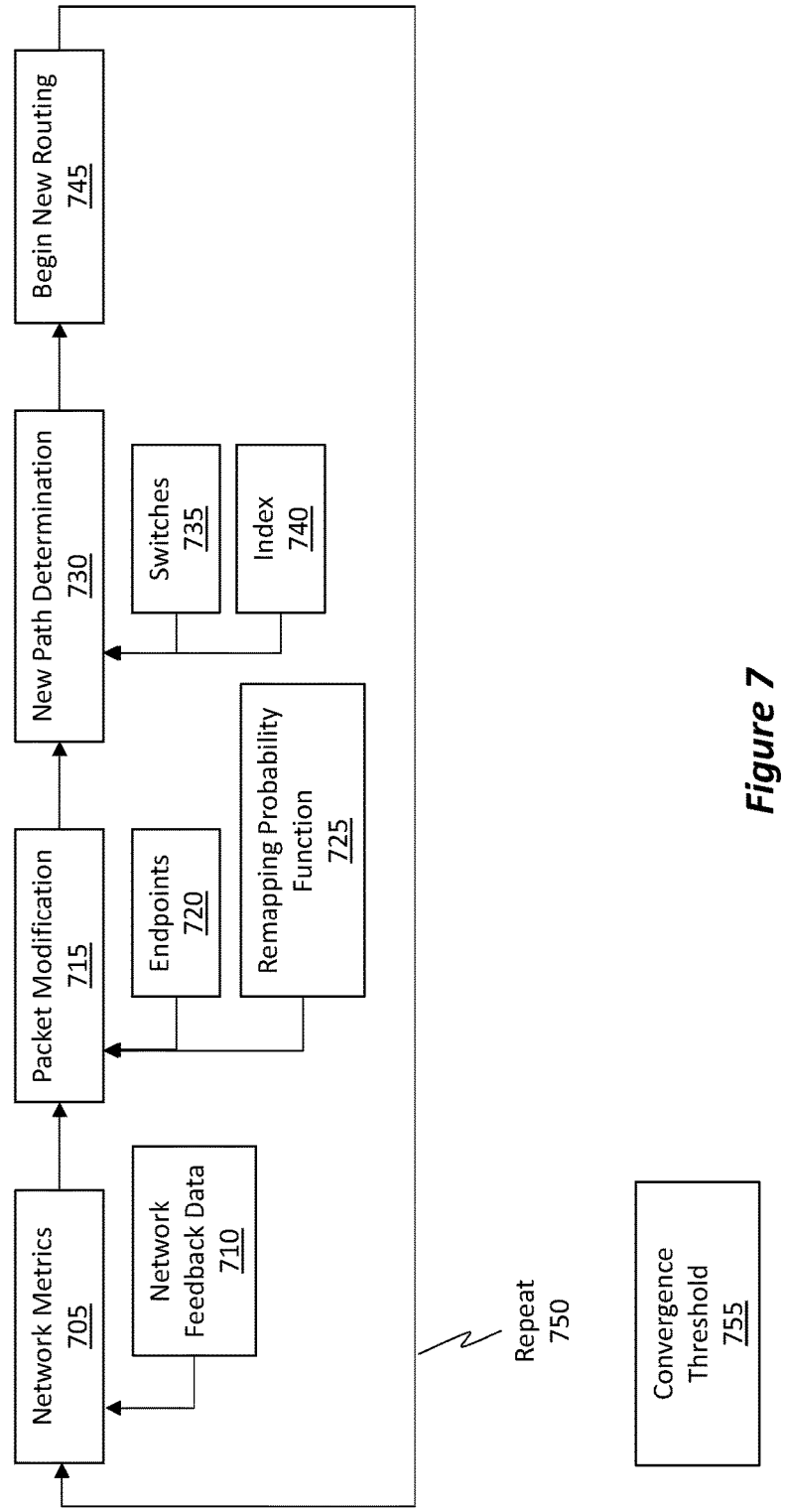
FIG. 7 illustrates an example process for triggering a remapping of a flow.

FIG. 7 shows an example process flow 700 that can be followed to remap a flow to reduce or mitigate congestion in a network. Initially, the process flow 700 includes a step 705 of acquiring network metrics, such as network feedback data 710. The network feedback data 710 is representative of the feedback 630 mentioned in FIG. 6. The endpoints can receive the network metrics from the various switches in the network.

Based on the feedback, the endpoints can determine that the network is congested. As a result, the endpoints trigger a step 715 in which packets of a flow are modified. That is, the endpoints 720 trigger the packet modification step 715.

As mentioned previously, the ECMP process performs a hash on various field values in a packet's control information (e.g., perhaps the 5-tuple information). In accordance with the disclosed principles, the embodiments select a field in the control information to modify that field's value. Beneficially, the embodiments select a field whose modification will not alter the end destination for that packet. As an example, the embodiments can modify the source port for a packet. Modifying the value in the source port field will have no impact or effect on where that packet will be delivered.

By modifying this value, however, the resulting hash will be different than it was originally. Because the resulting hash will be different, the hash will be mapped or indexed to a new switch (more particularly, to an output port or link), thereby resulting in the packet following a different path through the network and thereby causing the rest of the flow to also traverse the new/different path through the network. Accordingly, in order to remap a flow to cause that flow to follow a different path through the network, the endpoints are configured to alter a value in a header of the flow's packets. The modification to this header value will cause the subsequent packets in that flow to traverse a new path through the network when the switches perform their respective hashing operations. By causing the flow to follow a new path, the embodiments can beneficially redirect or remap flows in a manner so that congestion is avoided. Further details on this aspect will be provided later.

The determination as to which flow to remap can optionally be based on a remapping probability function 725. In terms of simplicity, the simplest remapping option would be to remap every flow every time congestion is detected in the network. That option, however, can sometimes cause issues. For instance, if every flow were to be remapped when congestion was detected, then the remapping might end up contributing even more to the congestion problem.

As an analogy, consider a scenario where drivers were driving on an interstate. In response to an upcoming construction area, everybody's GPS reroutes them all to use the same detour. In this scenario, the detour route will now be highly congested, and the rerouting did not solve the problem. Thus, it is beneficial to employ some intelligence in selecting which flows to remap. Similar to this analogy, the disclosed embodiments employ intelligence in selecting which flows to reroute in an effort to avoid additional collisions, congestion, or oversubscription scenarios. Notably, the embodiments can be restrictive when rerouting or remapping occurs, such that the remapping process is not overly aggressive.

Beneficially, some embodiments attempt to sort the different flows into different buckets based on how severe the congestion is for each of those different flows. Prioritization based on congestion levels can then used to determine whether a flow is to be remapped.

As an example, the embodiments can review various metrics, including a normalized congestion notification packet (CNP). As sender endpoints receive these CNPs, the sender endpoints are able to keep track over a time window of how many CNPs have been received. The sender endpoints can also normalize the CNPs based on how many packets the sender endpoints have sent.

For example, if a sender endpoint were to send 1,000 packets and were to receive CNPs for 100 of those packets, the endpoint can generate a table illustrating the probability that a flow should be remapped based on the determined congestion, as determined by the relationship between packets sent and CNPs detected.

The idea here is that the endpoints do not necessarily want to treat all the flows uniformly because if some links are oversubscribed (e.g., perhaps by 800% or some other value), the flows going through those links should have higher probabilities to remap because those are likely the flows that are really suffering. In contrast, links that are only marginally oversubscribed do not need to have their corresponding flows be remapped as aggressively as flows going through links that are severely oversubscribed. Thus, flows can be selectively remapped based on how poorly their transmission rates are suffering. The remapping probability function is able to gauge or determine how poorly a flow is traveling through the network. The remapping probability function can then be used to prioritize the remapping of flows in an attempt to reduce congestion and to provide a faster path through the network for a flow.

In this sense, the remapping probability function does not necessarily result in a strict prioritization scheme. As an example, if an endpoint has multiple flows, the embodiments could trigger the remapping of only a first flow from that endpoint while leaving the other flows in their original state. Remapping one flow (despite multiple ones potentially colliding with one another) can potentially result in reduced congestion even though originally multiple flows were colliding. Accordingly, the embodiments can be selective in determining which flows are to be remapped.

The mapping iteration length can also be independent of the observation window duration and can range from a few microseconds (e.g., order of network RTT) up to seconds, depending on traffic characteristics and reaction time requirements. The remapping decision is probabilistic and can depend on absolute (e.g., goodput threshold) and relative metrics (e.g., flow with highest normalized CNPs received over observation window) that are fed into a function that produced a remapping probability.

In its simplest form, the remapping probability function can be a table that maps ranges for a given metric to a flow remapping probability (e.g., flows with average RTT from 20 us to 60 us, may be remapped with 5% probability). The remapping probability function can also be adjusted over time depending on network conditions (e.g., in the case of a table-based probability mapping function, the table can be adjusted to initially focus only on remapping flows with high degrees of oversubscription and gradually start remapping flows with less severe oversubscription as overall network congestion improves).

In any event, when a flow is selected for remapping, the embodiments can perform a step 730 of determining or influencing a new path for that flow. This process is performed by an endpoint modifying one of the fields in a packet of the flow. When the packet reaches a switch, the switch (e.g., as shown by the switches 735) performs a hashing operation on a set of values in the header of the packet. In some cases, performing the hash on the field values in the header is performed using an equal-cost multi-path (ECMP) hashing function.

The resulting hash is then mapped or indexed (as shown by index 740) to a next switch (more particularly, to the next output port or link) in the network. Because the hash is different than it was previously (as a result of performing a hash on a new set of input data), the path the packet will follow will be different that the earlier path used by earlier packets. Each switch that receives the packet will perform its own corresponding hashing operation to select the next switch to receive the packet. Performing the hash on the field values in the header after the value in the selected field was modified results in a random generation of a new/second path. As a result, the second path is not a pre-selected path.

As the packets in the flow are subsequently modified by the endpoint, the flow will begin to traverse a new path through the network. The step 745 reflects the scenario where the flow begins a new routing or a new path through the network. After the new network packets of the flow are caused to follow the remapped second path, new network feedback data is received and is used to determine whether the network is still congested.

The process flow 700 can be repeated, as shown by repeat 750 until a convergence threshold 755 is achieved. The convergence threshold 755 can reflect a level of collisions or a level of congestion that is present in the network. If the number of collisions is below the convergence threshold 755, then the process flow 700 can end. On the other hand, if (even after an initial remapping event) the convergence threshold 755 is not met even after a predefined period of time after a remapping event (in order to allow the network to settle), then the process flow 700 can be repeated and another remapping event can be triggered. In some embodiments, there is no limit to the number of times that a flow might be remapped.

Figure 8:
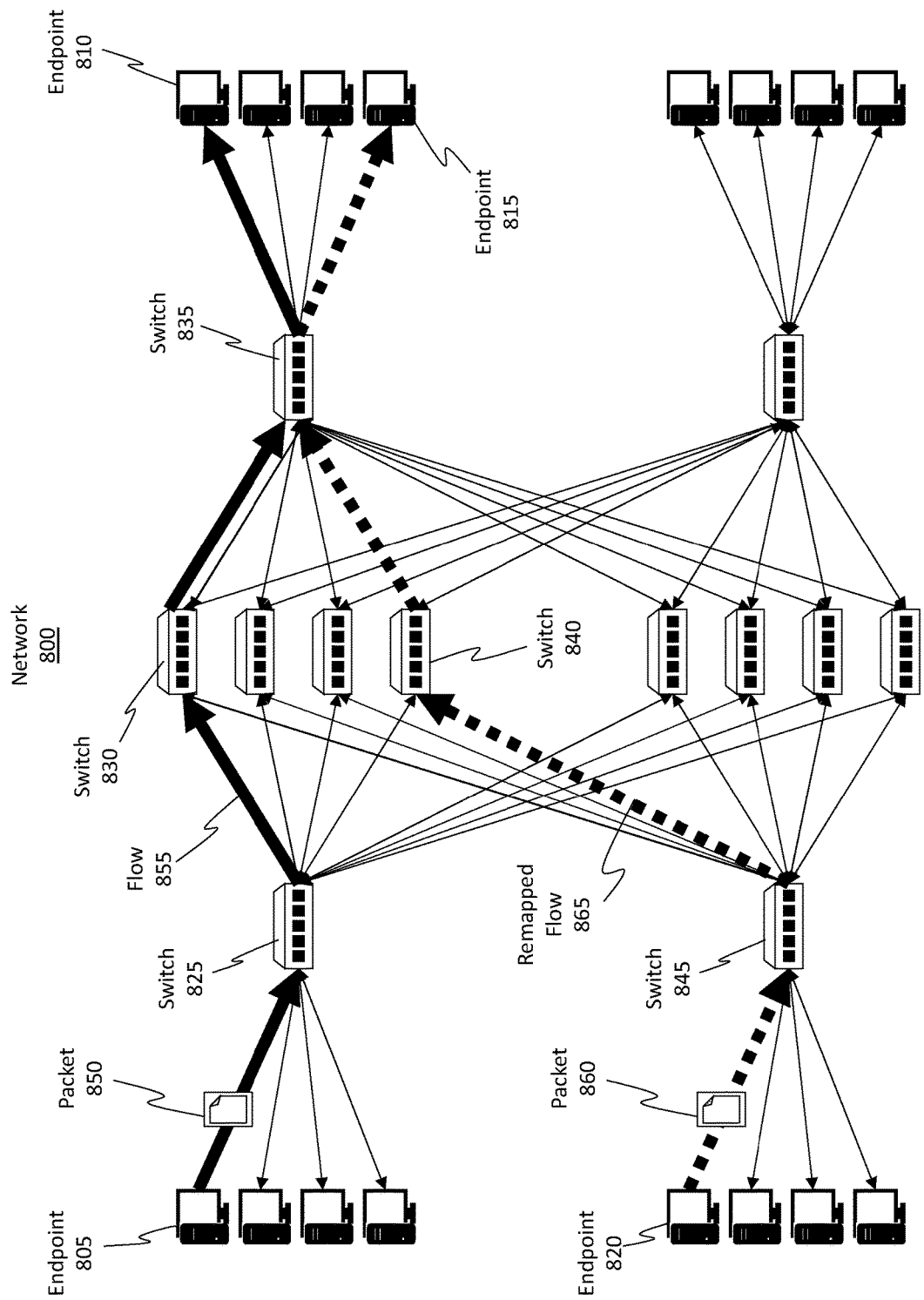
FIG. 8 illustrates an example of a network in which a flow has been remapped to avoid congestion.

FIG. 8 shows a result of remapping one of the flows shown in FIG. 5. Specifically, FIG. 8 shows a network 800 comprising endpoints 805, 810, 815, and 820. Network 800 further includes switches 825, 830, 835, 840, and 845. The endpoint 805 is transmitting packets, such as packet 850, in the form of a flow 855. Similarly, the endpoint 820 is transmitting packets, such as packet 860, in the form of the remapped flow 865. The remapped flow 865 is a remapped version of the flow 510 from FIG. 5. Previously, the flow 505 and 510 collided with one another at the switch 515. In response to detecting this collision via the network feedback data, the endpoint 820 triggered a remapping event for the flow 510, resulting in the flow subsequently following a new path, as represented by the remapped flow 865. Causing the flow to be remapped is performed by the endpoint 820 modifying a header value for each new packet that is a part of the flow. As a result of this modification, the switches produce a new hash result which caused the flow to follow a new path through the network. Accordingly, by modifying a value in a packet's header, the embodiments are able to remap or reroute an entire flow.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9A:
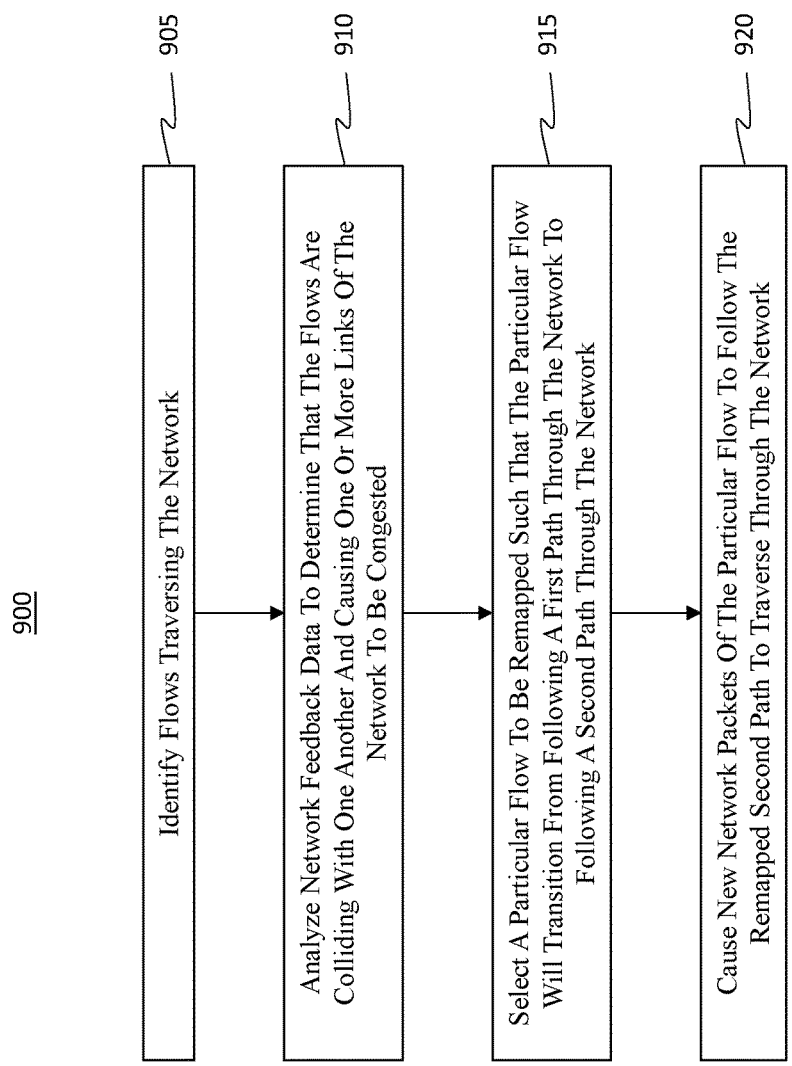
FIGS. 9A and 9B illustrate flowcharts of an example method for triggering a flow to follow a new path through the network.
Figure 9B:
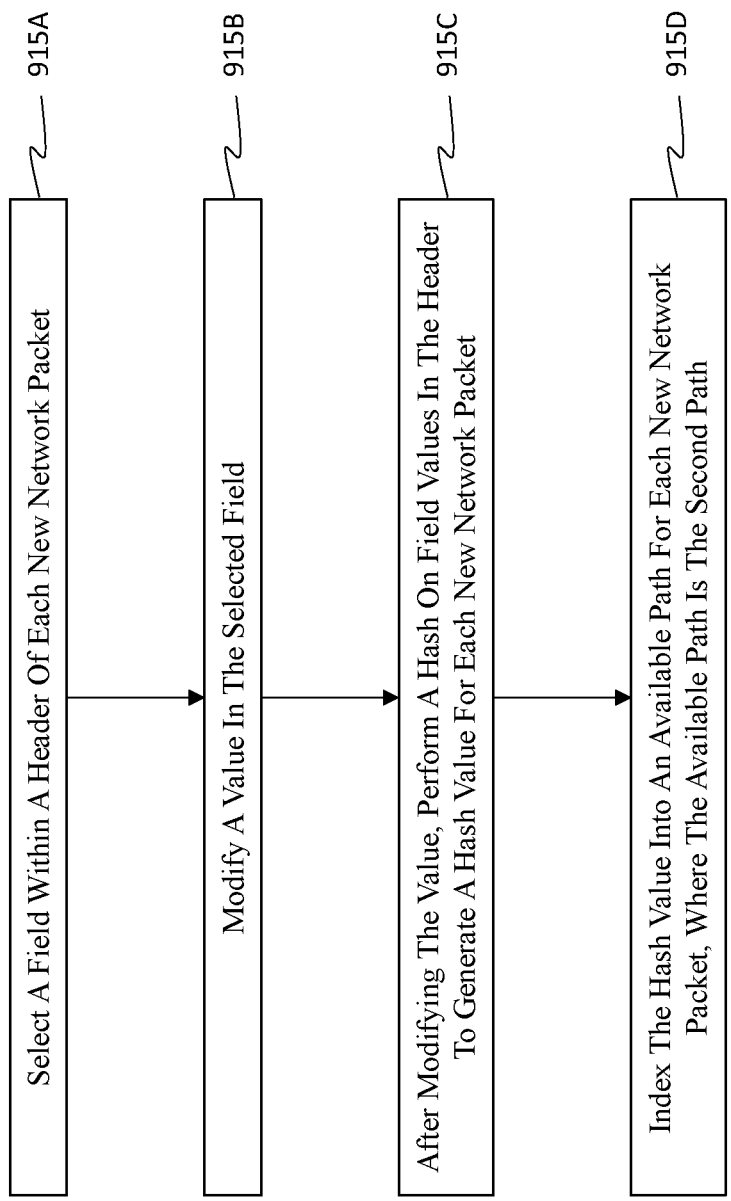

Attention will now be directed to FIGS. 9A and 9B, which illustrate flowcharts of an example method 900 for triggering a flow to follow a new path through a network. Notably, the flow is comprised of a plurality of network packets having similar characteristics such that switches in the network route the plurality of network packets through a same path. By triggering the flow to follow the new path, congestion in the network is attempted to be reduced. Method 900 can be performed by an endpoint that is a source for a flow as well as by various switches the route the flow through the network.

Method 900 includes an act (act 905) of identifying (e.g., by an endpoint) a plurality of flows traversing the network. For instance, the flows 505 and 510 of FIG. 5 can be identified. In some cases, the flows originate from the same endpoint.

Act 910 includes analyzing (e.g., by the endpoint) network feedback data to determine that the plurality of flows are colliding with one another and are causing one or more links of the network to be congested. For instance, an endpoint in the network (e.g., the origination endpoint for a flow) can receive feedback data from the switches in the network. The endpoint can analyze that data to determine whether flows are colliding with one another at a particular switch. The network feedback data can optionally include one or more of: a round trip latency for network packets, an explicit congestion notification (ECN) mark on network packets, a goodput metric, a buffer state, or a congestion notification packet (CNP) metric.

Act 915 includes selecting (e.g., by the endpoint) a particular flow, which is included among the plurality of flows, to be remapped such that the particular flow will transition from following a first path through the network to following a second path through the network. In some cases, the process of selecting the particular flow is based on a remapping probability function that determines which flow out of the plurality of flows to remap based on relative congestion levels for the plurality of flows.

Remapping the particular flow includes various acts, as outlined in FIG. 9B. For instance, the acts in FIG. 9B are performed for each new network packet in the particular flow. To illustrate, act 915A includes selecting (e.g., by the endpoint) a field within a header of each new network packet. The header that is selected is one whose modification will not result in the packet being sent to a new destination endpoint. For instance, it is often the case that the source port value can be changed because changing this value will not impact the destination location of the packet. In this manner, the selected field may include the source port value.

Act 915B includes modifying (e.g., by the endpoint) a value in the selected field. The modification of this value can be performed in an arbitrary manner. As mentioned previously, modifying the value in the selected field can include modifying a particular value whose modification will not result in a change as to where the particular flow will be delivered to.

After modifying the value, act 915C includes performing (e.g., by one or more switches) a hash on field values in the header, including the modified value, to generate a hash value for each new network packet. As indicated above, this act can be performed by each switch in the network that receives the packet. In some cases, the process of performing the hash on the field values in the header can include performing the hash on the following fields (or rather, the values in these fields): a source network address field (which can include both a source IP address and a source port value), a destination network address (which can include both a destination IP address and a destination port value), and a protocol.

Act 915D includes indexing (e.g., by the one or more switches) the hash value into an available path for each new network packet, where the available path is the second path. The second path is typically different from the first path in that the second path typically includes at least one switch that is not included in the first path. The phrase "indexing the hash value into an available path" generally means that the hash is indexed to a subsequent switch, which switch then performs another hash operation, the resulting hash from that hash operation is then indexed to another switch, and so on and so forth until the packet reaches the destination endpoint.

Returning to FIG. 9A, act 920 includes causing (e.g., by the one or more switches) new network packets of the particular flow to follow the remapped second path to traverse through the network. That is, the endpoint modified the packet's header field. The packets are then sent to a first switch in the network. From there, the packets (and hence the flow) will follow a new path because the switches will select the new path based on the modified value in the header. Method 900 can be repeated, or rather is repeatable, until a convergence threshold is met.

The disclosed functions are available when multiple paths exist between a source endpoint and a destination endpoint. For instance, both the first path and the second path are available for routing the particular flow from a source endpoint to a destination endpoint. In some cases, a third path might also be available for routing the particular flow from the source endpoint to the destination endpoint. It may be the case that an almost unlimited number of paths exist.

In some cases, the embodiments avoid storing a record of previous paths used by the particular flow to traverse through the network when the flow is remapped. It is often the case that while one path may be congested at one point in time, that path may open up at a later point in time and no longer be congested. Thus, there is no significant benefit to avoiding the use of previous paths followed by a flow. For instance, it may be the case that a flow is initially following path "A." Later, the flow may be remapped to path "B" and then perhaps to path "C." At some later point in time, the flow may be remapped back to path "A," and there might not be congestion on that path. In this sense, the embodiments can avoid or refrain from storing data related to previous paths because the network often fluctuates and just because a path was previously congested may not mean that the path is subsequently congested.

Accordingly, the disclosed embodiments enable endpoints to monitor network flow metrics over time (e.g., round-trip latency, goodput, a number of ECN-marked or congestion notification packets, etc.) to detect and remap flows that are mapped to oversubscribed links. Remapping of flows is achieved by having the sending endpoints change one of the fields (e.g., the value of the source port) in the packet headers that are used as input to the ECMP hashing function of the switches. A remapping algorithm (e.g., the remapping probability function), which can be centralized or distributed, collects per-flow metrics over an observation window and can be used to determine if and which flows to remap on each mapping iteration.

Compared to traditional ECMP, which is limited to the random path selection resulting from the switches' hashing functions, the disclosed techniques can adapt to changing network conditions and dynamically load balance flows to significantly or even completely eliminate congestion due to link oversubscription. The disclosed techniques are lightweight and do not require any network fabric changes as all the remapping logic can be implemented in the network endpoints.

Example Computer/Computer Systems

Figure 10:
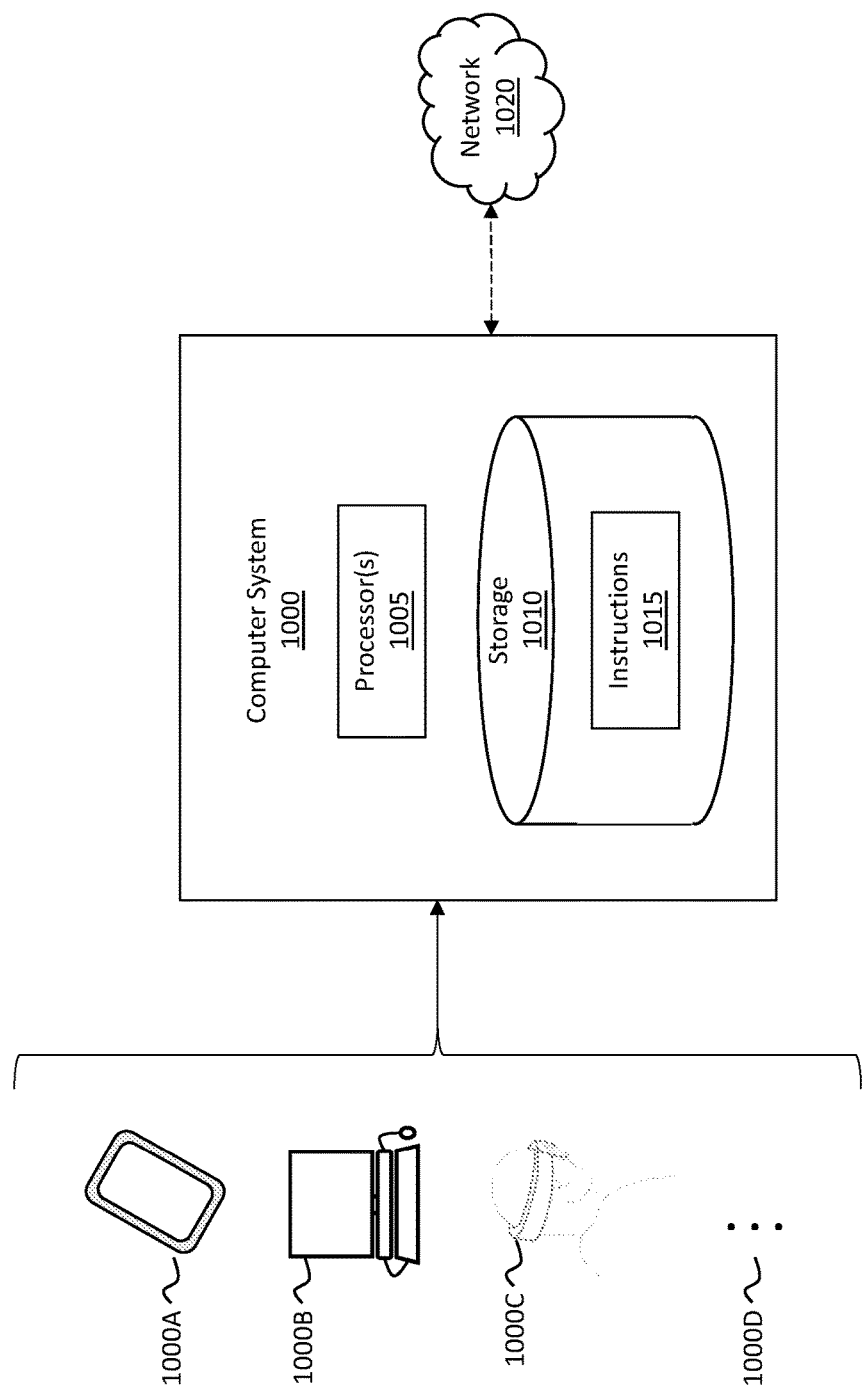
FIG. 10 illustrates an example computer system that can be configured to perform any of the disclosed operations.

Attention will now be directed to FIG. 10 which illustrates an example computer system 1000 that may include and/or be used to perform any of the operations described herein. Further, the computer system 1000 can be any of the endpoints or switches mentioned herein.

Computer system 1000 may take various different forms. For example, computer system 1000 may be embodied as a tablet 1000A, a desktop or a laptop 1000B, a wearable device 1000C, a mobile device, or any standalone device as represented by the ellipsis 1000D. Computer system 1000 may also be a distributed system that includes one or more connected computing components/devices that are in communication with computer system 1000.

In its most basic configuration, computer system 1000 includes various different components. FIG. 10 shows that computer system 1000 includes one or more processor(s) 1005 (aka a "hardware processing unit") and storage 1010.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1010 is shown as including executable instructions 1015. The executable instructions 1015 represent instructions that are executable by the processor(s) 1005 of computer system 1000 to perform the disclosed operations, such as those described in the various methods.

The disclosed embodiments may comprise or utilize a special-purpose or general-purpose computer including computer hardware, such as, for example, one or more processors (such as processor(s) 1005) and system memory (such as storage 1010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number devices or cloud services to obtain or process data. In some cases, network 1020 may itself be a cloud network. Furthermore, computer system 1000 may also be connected through one or more wired or wireless networks to remote/separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for triggering a flow to follow a new path through a network, where the flow is comprised of a plurality of network packets having similar characteristics such that switches in the network route the plurality of network packets through a same path, wherein, by triggering the flow to follow the new path, congestion in the network is attempted to be reduced, said method comprising:
   identifying a plurality of flows traversing the network;
   analyzing network feedback data to determine that the plurality of flows are colliding with one another and are causing one or more links of the network to be congested;
   selecting a particular flow, which is included among the plurality of flows, to be remapped such that the particular flow will transition from following a first path through the network to following a second path through the network, wherein remapping the particular flow includes, for each new network packet in the particular flow, performing the following:
      selecting a field within a header of said each new network packet;
      modifying a value in the selected field;
      after modifying the value, performing a hash on field values in the header, including said modified value, to generate a hash value for said each new network packet; and
      indexing the hash value into an available path for said each new network packet, where the available path is the second path; and
   causing new network packets of the particular flow to follow the remapped second path to traverse through the network.

2. The method of claim 1, wherein the network feedback data includes one or more of: a round trip latency for network packets, an explicit congestion notification (ECN) mark on network packets, a goodput metric, a buffer state, or a congestion notification packet (CNP) metric.

3. The method of claim 1, wherein selecting the particular flow is based on a remapping probability function that determines which flow out of the plurality of flows to remap based on relative congestion levels for the plurality of flows.

4. The method of claim 1, wherein said method is repeatable until a convergence threshold is met.

5. The method of claim 1, wherein the selected field includes a source port value.

6. The method of claim 1, wherein performing the hash on the field values in the header includes performing the hash on values in the following fields: an Internet Protocol (IP) field, an ingress interface field, a source address field, and a destination address field.

7. The method of claim 6, wherein the source address field includes a source port value.

8. The method of claim 1, wherein modifying the value in the selected field includes modifying a particular value whose modification will not result in a change as to where the particular flow will be delivered.

9. The method of claim 1, wherein the second path is different from the first path in that the second path includes at least one switch that is not included in the first path.

10. The method of claim 1, wherein both the first path and the second path are available for routing the particular flow from a source endpoint to a destination endpoint, and wherein a third path is also available for routing the particular flow from the source endpoint to the destination endpoint.

11. The method of claim 1, wherein storing a record of previous paths used by the particular flow to traverse through the network is avoided when the particular flow is remapped.

12. The method of claim 1, wherein the network feedback data is received from switches in the network.

13. The method of claim 1, wherein the endpoint is one of a plurality of endpoints in the network, and wherein global visibility is not provided for the plurality of endpoints.

14. The method of claim 1, wherein performing the hash on the field values in the header after the value in the selected field was modified results in a random generation of the second path such that the second path is not a pre-selected path.

15. The method of claim 1, wherein, after the new network packets of the particular flow are caused to follow the remapped second path, new network feedback data is received and is used to determine whether the network is still congested.

16. A network configured to trigger a flow to follow a new path through the network, where the flow is comprised of a plurality of network packets having similar characteristics such that switches in the network route the plurality of network packets through a same path, wherein, by triggering the flow to follow the new path, congestion in the network is attempted to be reduced, said network comprising:
one or more processors; and
one or more computer-readable hardware storage devices that store instructions that are executable by the one or more processors to cause the network to:
identify a plurality of flows traversing the network;
analyze network feedback data to determine that the plurality of flows are colliding with one another and are causing one or more links of the network to be congested;
select a particular flow, which is included among the plurality of flows, to be remapped such that the particular flow will transition from following a first path through the network to following a second path through the network, wherein remapping the particular flow includes, for each new network packet in the particular flow, performing the following:
select a field within a header of said each new network packet;
modify a value in the selected field;
after modifying the value, perform a hash on field values in the header, including said modified value, to generate a hash value for said each new network packet; and
index the hash value into an available path for said each new network packet, where the available path is the second path; and
cause new network packets of the particular flow to follow the remapped second path to traverse through the network.

17. The network of claim 16, wherein performing the hash on the field values in the header is performed using an equal-cost multi-path (ECMP) hashing function.

18. The network of claim 16, wherein selecting the particular flow is based on a remapping probability function that determines which flow out of the plurality of flows to remap based on relative congestion levels for the plurality of flows.

19. A method for triggering a flow to follow a new path through a network, where the flow is comprised of a plurality of network packets having similar characteristics such that switches in the network route the plurality of network packets through a same path, wherein, by triggering the flow to follow the new path, congestion in the network is attempted to be reduced, said method comprising:
identifying a plurality of flows traversing the network;
analyzing network feedback data to determine that the plurality of flows are colliding with one another and are causing one or more links of the network to be congested;
selecting a particular flow, which is included among the plurality of flows, to be remapped such that the particular flow will transition from following a first path through the network to following a second path through the network, wherein:
selecting the particular flow is based on a remapping probability function that determines which flow out of the plurality of flows to remap based on relative congestion levels for the plurality of flows, and
remapping the particular flow includes, for each new network packet in the particular flow, performing the following:
selecting a field within a header of said each new network packet;
modifying a value in the selected field;
after modifying the value, performing a hash on field values in the header, including said modified value, to generate a hash value for said each new network packet; and
indexing the hash value into an available path for said each new network packet, where the available path is the second path; and
causing new network packets of the particular flow to follow the remapped second path to traverse through the network.

20. The method of claim 19, wherein the similar characteristics of the plurality of network packets, which similar characteristics cause the plurality of network packets to be included in the same flow, include similar header characteristics.

* * * * *